United States Patent

Purland et al.

[15] 3,646,751

[45] Mar. 7, 1972

[54] DIGITAL TIMING SYSTEM

[72] Inventors: Donald A. Purland, Eden Prairie; Alan M. Gustafson, Minneapolis, both of Minn.

[73] Assignee: Detection Sciences, Inc., Minneapolis, Minn.

[22] Filed: Dec. 5, 1969

[21] Appl. No.: 882,413

[52] U.S. Cl. ............................................. 58/152, 58/50
[51] Int. Cl. .................................. G07c 1/00, G04b 19/00
[58] Field of Search ............................... 58/4, 5, 23, 50, 152

[56] References Cited

UNITED STATES PATENTS

3,258,906  7/1966  Demby ........................... 58/23 X
3,333,410  8/1967  Barbella ......................... 58/23 X

*Primary Examiner*—Richard B. Wilkinson
*Assistant Examiner*—Edith C. Simmons
*Attorney*—Merchant & Gould

[57] ABSTRACT

A digital timing system for recording a plurality of timing functions and displaying these functions in digital form. A high-frequency crystal control oscillator provides timing pulses which are fed to a pulse rate divider circuit which provides a plurality of outputs at different time rates. Each of the outputs of the divider circuit are fed to an individual counter circuit which counts the pulses to record a specified timing function. A digital display circuit is switchably connected between the outputs of each of the counter circuits to individually display the time recorded in each counter without disturbing the continued counting of the counters. The output of one of the counters is compared with a variable comparative circuit which can be preset over a range of predetermined times. When the output of the counter is equal to the preset time in the comparator, a signal is produced which will reset the counter and initiate an overtime count.

12 Claims, 7 Drawing Figures

Fig. 2

PATENTED MAR 7 1972

INVENTORS.
ALAN M. GUSTAFSON
DONALD A. PURLAND
BY Merchant & Gould
ATTORNEYS

DIGITAL TIMING SYSTEM

BACKGROUND OF THE INVENTION

This invention pertains to clocks, and more particularly to digital clocks for use in the aviation field. There are three timing functions which are particularly useful to a pilot in the control and operation of his aircraft. The first is Greenwich Mean Time or Zulu Time; the second is total elapsed flight time, or the time that the aircraft has been in the air since takeoff; and the third is approach time, in other words, how long an aircraft has been on a particular leg of an approach or how long it has been descending toward landing.

With the great increase in aviation, including military, commercial, and private flying, and with the advent of high speed aircraft and more complicated and sophisticated aircraft equipment, a pilot has more and more activities to perform in the operation of his aircraft and less and less time in which to perform these activities. Furthermore, with the heavy aircraft congestion around airports a pilot must make numerous decisions regarding the control of his aircraft, he must make these decisions in a minimum amount of time, and he must make these decisions without error. Therefore, it is essential that the aircraft instrumentation impart to the pilot the greatest amount of information possible in the simplest form.

For example, charts of all major airports indicate the required approach time from an airport outer marker to a missed approach point. This time indicates to the pilot how long he has from the time he passes the outer marker until he should see the runway. Since the pilot knows the rate of descent and speed of his aircraft and the amount of runway needed to bring the aircraft to a stop, he knows how many seconds he can be over his required approach time and still have enough runway left beneath the plane to safely stop the aircraft. Because of the high speeds of modernday aircraft, it is essential that the time measurement from the outer marker to the runway be accurately measured and instantaneously and simply displayed to the pilot. Any error in the calculation of this figure could be fatal to the pilot and passengers. It is essential, therefore, that the approach time be displayed simply and accurately to the pilot.

PRIOR ART

In most aircraft today no provision is made for automatically and continuously recording the various flight and reference times, rather these times are calculated by the pilot during aircraft operation. These calculations, of necessity, detract from the pilot's observation of aircraft operation and are, of course, subject to human error. Most aircraft are equipped with a clock having a sweep second hand, not dissimilar to the face of a sweep second hand wristwatch, and aircraft approach time is computed by the pilot noting the clock hands at the time the aircraft passes the outer marker, computing what the time should be when the aircraft reaches the runway, and then attempting to keep track of the elapsed time at the same time he controls the aircraft operation during landing. It is readily apparent that this procedure is highly susceptible to error.

PRESENT INVENTION

In the timing system of the present invention, a high frequency very accurate crystal control oscillator is utilized to produce a series of output timing pulses at a very accurate pulse rate. These timing pulses are fed to a pulse rate divider circuit which produces a plurality of outputs at known pulse rates, for example, 1 pulse per second and 1 pulse per minute. Where the outputs of the divider circuit having an output of 1 pulse per minute is connected to a pulse counter, there is a capability of counting 1,440 pulses, equal to the number of minutes in one day. This counter continually counts the pulses from the 1 pulse per second output of the divider circuit and is utilized to indicate a reference time, usually Greenwich Mean Time.

Another output of the divider circuit, also producing output pulses at a rate of one per minute, is connected to a second counter capable of counting 1,800 pulses, equal to the number of minutes in 30 hours. The second counter is utilized to record elapsed flight time and is switched to a counting mode when the aircraft takes off.

A third output from the divider circuit, having output pulses at a rate of 1 per second, is connected to a third counter circuit capable of counting 1,800 pulses, equal to the number of seconds in 30 minutes. This counter is utilized to record approach time from the outer marker to the missed approach point. The output of the approach time counter is connected to the variable comparator which is setable over a predetermined range of times. The comparator circuit produces an output signal when the time measured by the approach time counter equals the preset time of the comparator. The output signal from the comparator is fed back to the approach time counter to reset the counter to zero and cause it to begin a recount. Therefore, if the time from the outer marker to the runway of a particular airport is listed as 1 minute, the setable comparator circuit is set to 1 minute and the approach time counter is switched to count mode as the aircraft crosses the airport outer marker. When the count in the approach time counter equals the comparator preset time, namely, 1 minute, the output from the comparator causes the approach time counter to begin recounting from zero. When the approach time counter resets to zero and begins recounting, the pilot knows he should be at the runway and he has an immediate indication of how many seconds he is over his approach time if he is not already on the runway.

A binary to decimal decoder has its output connected to electronic digital display, or nixie, tubes, and its input is switchably connected to the outputs of each of the pulse counter circuits. In this manner the single digital display unit can read the outputs from each of the counters and display any of the desired time functions, i.e., Greenwich Mean Time, total flight time, and approach time.

It is one object of the present invention to provide an improved digital timing system.

It is another object of the present invention to provide an improved digital timing system capable of displaying a plurality of timing functions.

A further object of the present invention is to provide a digital timing system which will time a preset time period and indicate when the time period has elapsed, and how long ago the initial time period elapsed.

It is a further object of the present invention to provide a digital timing system wherein a plurality of pulse counters are utilized to record a plurality of distinct time functions, and wherein a digital display unit is switchable from the outputs of said counters to individually display the time count stored in each counter.

These and other objects of the present invention will become apparent to those skilled in the art upon consideration of the accompanying specification, claims and drawings.

DESCRIPTION OF THE DRAWINGS

Referring to the drawings wherein like numerals indicate like parts throughout the several views.

Referring to the drawings, there is shown a high frequency crystal control timing pulse generator 20 which produces output pulses at a rate of 100,000 Hertz. An output 21 of pulse generator 20 is connected to an input 22 of a pulse rate divider circuit 23. Pulse rate divider 23 further has outputs 24, 25, 26 and 27 and a reset input 28. Output 24 of pulse rate divider circuit 23 produces output pulses at a 1,000 Hertz rate. Output 25 of divider 23 produces output pulses at a rate of 1 per second, while outputs 26 and 27 of divider 23 produce output pulses at a rate of 1 pulse per minute.

Output 27 of divider 23 is connected by means of a conductor 30 to a pulse input 31 of a flight time BCD counter circuit 32. Flight time counter 32 has BCD weighted outputs 1 through 7 and 9 through 14 and a reset input 33.

Figure 2:
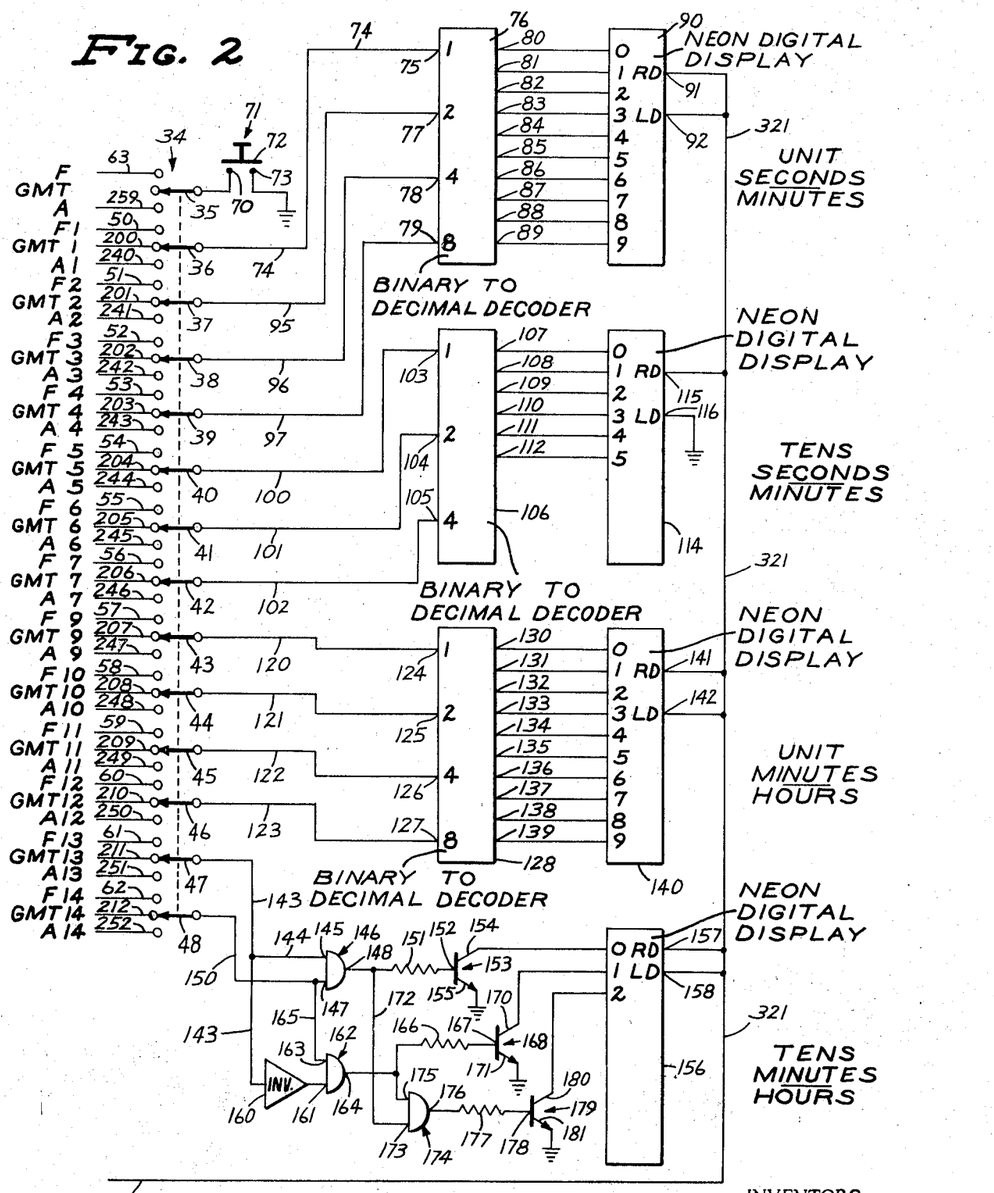

Referring to FIG. 2, there is shown a 14-pole switch 34 having 14 movable contacts 35 through 48. Each of the movable contacts of switch 34 has three stationary contacts associated therewith. The three stationary contacts of each of the positions of switch 34 carry the designation F (flight time), GMT (Greenwich Mean Time), and A (approach time). As can be seen from FIG. 2, the first position of switch 34, associated with movable contact 35, has one fixed contact marked with the designation F, one fixed contact marked with the designation GMT, and one fixed contact marked with the designation A. The next switch position of switch 34, associated with movable contact 36, has a first fixed contact having a designation F-1, a second fixed contact having a designation GMT-1, and a third fixed contact having a designation A-1. Each of the fixed contacts of succeeding switch positions carry the same letter designation with the numeral designation increasing by one for each switch position. Therefore, movable contact 48 of switch 34 has associated therewith a fixed contact F-14, a fixed contact GMT-14, and a fixed contact A-14.

The numerical 1 output of flight time counter 32 is connected by means of a conductor 50 to the F-1 contact of switch 34. Similarly, outputs 2 through 7 and 9 through 14 are connected by means of conductors 51 through 62 to the fixed contacts F-2 through F-14, respectively, of switch 34.

Fixed contact F of switch 34 is connected by means of a conductor 63 to a first input 64 of an AND-gate 65. AND-gate 65 further has a second input 66 and an output 67. Output 67 of AND-gate 65 is connected to the reset input 33 of flight time counter 32. Input 64 of AND-gate is also connected through a resistor 68 to a source of positive potential 69.

Movable contact 35 of switch 34 is connected to a fixed contact 70 of a momentary switch 71. Switch 71 further has a movable pushbutton contact 72 and a second fixed contact 73. Contact 73 of switch 71 is connected to a circuit common.

Movable contact 36 of switch 34 is connected by means of a conductor 74 to an input 75 of a binary to decimal decoder 76. Input 75 of binary to decimal decoder 76 is the 1 weight input. Binary to decimal decoder 76 further has a 2 weight input 77, a 4 weight input 78, and an 8 weight input 79. Binary to decimal decoder 76 has 10 outputs designated 80 through 89. Output 80 of binary to decimal decoder 76 is connected to a 0 input of a neon digital display 90. Digital display 90 further has inputs 1 through 9, and a right decimal point input 91 and a left decimal point input 92. Outputs 81 through 89 of binary to decimal decoder 76 are respectively connected to inputs 1 through 9 of neon digital display 90.

Movable contacts 37, 38 and 39 of switch 34 are respectively connected by means of conductors 95, 96 and 97 to inputs 77, 78 and 79 of binary to decimal decoder 76.

Movable contacts 40, 41 and 42 are respectively connected by means of conductors 100, 101, and 102 to inputs 103, 104, and 105 of a binary to decimal decoder 106. Input 103 of binary to decimal decoder 106 is the 1 weight input while inputs 104 and 105 are the 2 and 4 weight inputs of binary to decimal decoder 106. Binary to decimal decoder 106 further has six outputs 107 through 112. Outputs 107 through 112 of binary to decimal decoder 106 are respectively connected to six inputs 0 through 5 of a neon digital display 114. Digital display 114 further has a right decimal input 115 and a left decimal input 116. Left decimal input 116 of digital display 114 is connected to the common.

Movable contacts 43, 44, 45 and 46 of switch 34 are respectively connected by means of conductors 120, 121, 122 and 123 to inputs 124, 125, 126 and 127 of a binary to decimal decoder 128. Input 124 of the binary to decimal decoder 128 is the 1 weight input, while inputs 125, 126 and 127 of the decimal decoder 128 are the 2, 4, and 8 weight inputs.

Binary to decimal decoder 128 has 10 outputs designated 130 through 139 which are connected to 10 inputs 0 through 9, respectively, of a neon digital display 140. Neon digital display 140 further has a right decimal input 141 and left decimal input 142.

Movable contact 47 of switch 34 is connected by means of a conductor 143 and a conductor 144 to an input 145 of an AND-gate 146. AND-gate 146 further has a second input 147 and an output 148. Movable contact 48 of switch 34 is connected by means of a conductor 150 to the input 147 of AND-gate 146.

Output 164 of AND-gate 162 is connected through a resistor 166 to a base 167 of an NPN-transistor 168. Transistor 168 further has a collector 170 and an emitter 171. Emitter 171 of transistor 168 is connected to the common, while collector 170 of transistor 168 is connected to the 1 input of neon digital display 156.

Output 148 of AND-gate 146 is connected by means of a conductor 172 to an input 173 of an AND-gate 174. AND-gate 174 further has an input 175 and an output 176. Input 175 of AND-gate 174 is connected to the output 164 of AND-gate 162, while output 176 of AND-gate 174 is connected through a resistor 177 to a base 178 of an NPN-transistor 179. Transistor 179 further has a collector 180 and an emitter 181. Emitter 181 of transistor 179 is connected to the common, while collector 180 of transistor 179 is connected to the 2 input of the neon digital display 156.

Figure 3:
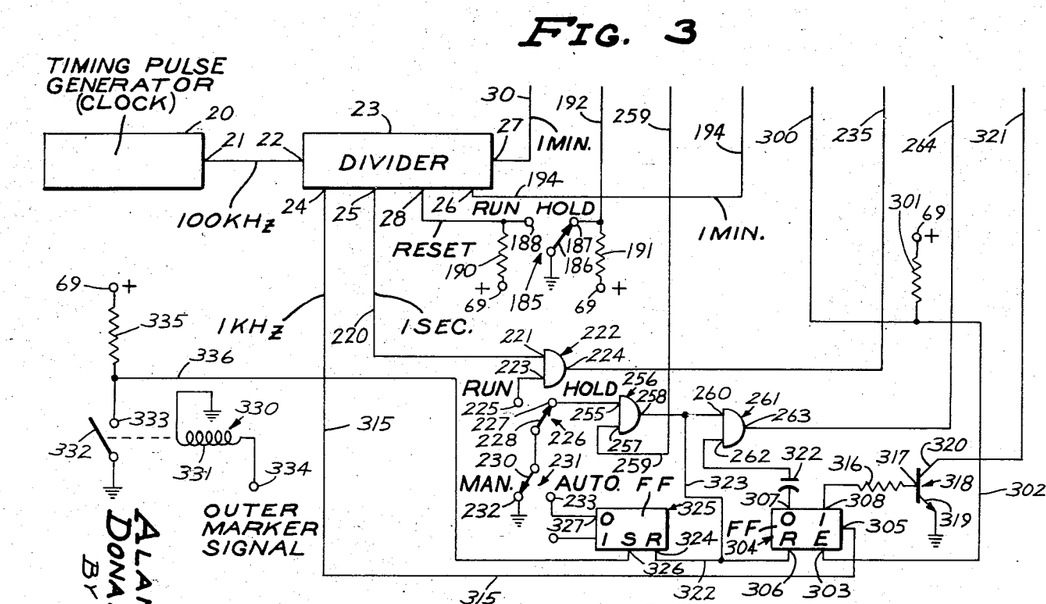

Referring to FIG. 3, there is shown a RUN/HOLD switch 185 having a movable contact 186, a fixed HOLD-contact 187 and a fixed RUN-contact 188. Contact 188 of switch 185 is connected through a resistor 190 to the positive potential source 69, and is also connected to the reset input 28 of pulse rate divider circuit 23. The HOLD-contact 187 of switch 185 is connected through a resistor 191 to the positive potential source 69, and is also connected by means of a conductor 192 to the input 66 of AND-gate 65.

The 1 pulse per minute output 26 of pulse rate divider circuit 23 is connected by means of a conductor 194 to an input 195 of a Greenwich Mean Time (GMT) pulse counter 196. GMT counter 196 has weighted outputs 1 through 7 and 9 through 14 and a reset input 197.

Outputs 1 through 7 of GMT counter 196 are respectively connected by means of seven conductors designated 200 through 206 to stationary contacts GMT-1 through GMT-7 of switch 34, while outputs 9 through 14 of GMT counter 196 are respectively connected by means of six conductors designated 207 through 212 to stationary contacts GMT-9 through GMT-14 of switch 34.

Output 11 of GMT counter 196 is connected by means of conductor 209 and a conductor 213 to an input 214 of an AND-gate 215. AND-gate 215 further has an input 216 and an output 217. Output 14 of GMT counter 196 is connected by means of conductor 212 to the input 216 of AND-gate 215, while the output 217 of AND-gate 215 is connected to the reset input 197 of GMT counter 196.

The 1 pulse per second output 25 of pulse rate divider circuit 23 is connected by means of a conductor 220 to an input 221 of an AND-gate 222. AND-gate 222 further has an input 223 and an output 224. Input 223 of AND-gate 222 is connected to a stationary contact 225 of a RUN/HOLD switch 226. Switch 226 further has a stationary HOLD-contact 227 and a movable contact 228, movable between the two stationary contacts 225 and 227. Movable contact 228 of switch 226 is connected to a movable contact 230 of a MANUAL/AUTO switch 231. Switch 231 has a stationary MANUAL-contact 232, which is connected to ground, and a stationary AUTO-contact 233.

Output 224 of AND-gate 222 is connected by means of a conductor 235 to an input 236 of an APPROACH TIME pulse counter 237. APPROACH TIME counter 237 has binary weighted outputs 1 through 7 and 9 through 14. Outputs 1 through 7 of APPROACH TIME counter 237 are connected by means of seven conductors designated 240 through 246, respectively, to the stationary A-1 through A-7 contacts of switch 34, while outputs 9 through 14 of APPROACH TIME counter 237 are connected by means of six conductors designated 247 through 252 to the stationary A-9 through A-14 contacts of switch 34.

Referring to FIG. 3, the stationary HOLD-contact 227 of switch 226 is connected to an input 255 of an AND-gate 256. AND-gate 256 further has an input 257 and an output 258. Input 257 of AND-gate 256 is connected by means of a conductor 259 to the stationary A contact of switch 34. The output 258 of AND-gate 256 is connected to an input 260 of an OR-gate 261. OR-gate 261 further has an input 262 and an output 263. The output 263 of OR-gate 261 is connected by means of a conductor 264 to a reset input 265 of APPROACH TIME counter 237.

Figure 1:
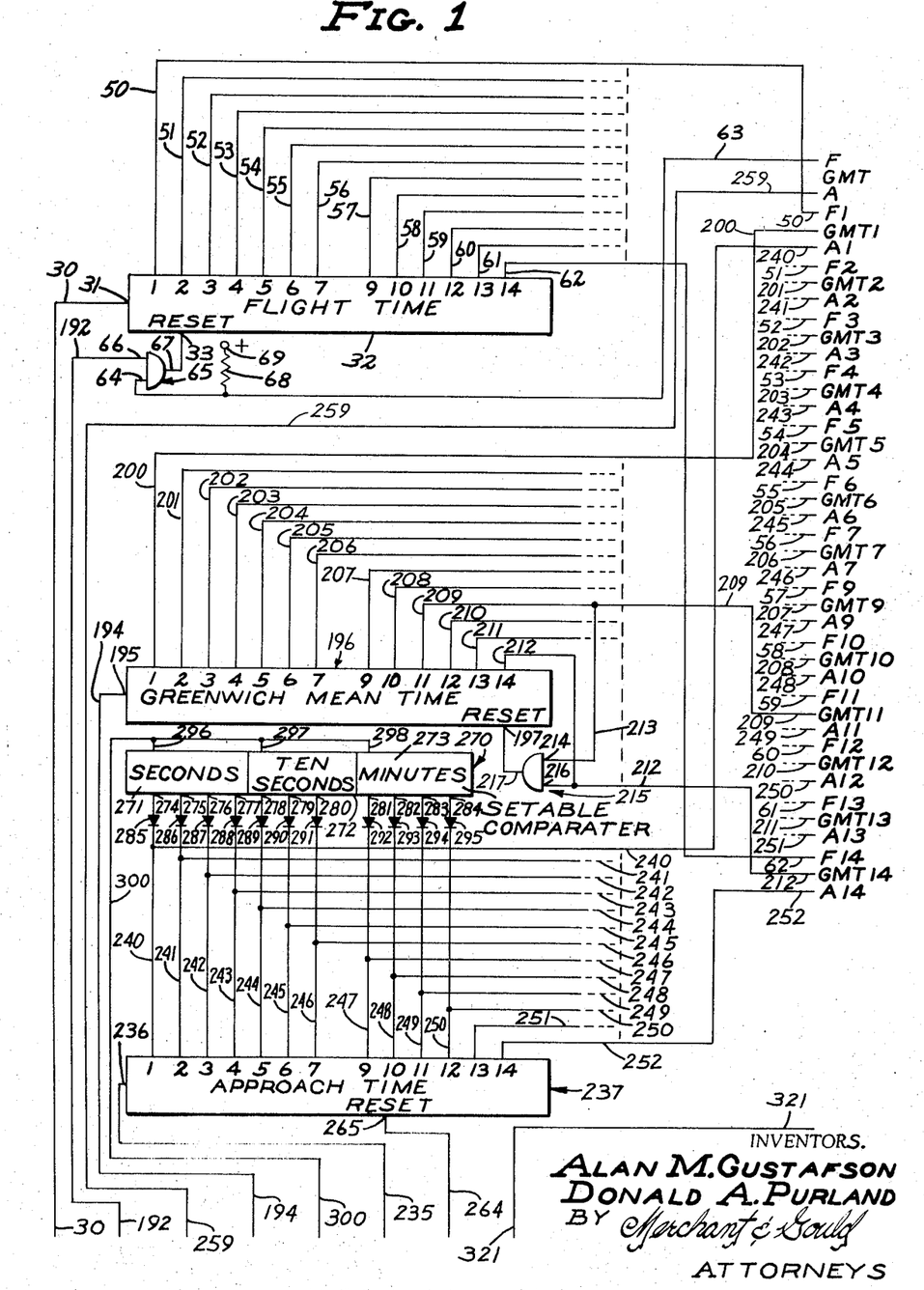
FIGS. 1, 2 and 3 illustrate portions of a schematic representation of an embodiment of the present invention.

Referring to FIG. 1, there is shown a setable comparator 270 which comprises three binary coded decimal (BCD) thumb-wheel switches 271, 272 and 273. Each of the BCD switches 271, 272 and 273 can be set by means of a thumb wheel to any digit from 0 through 9. These switches are available commercially and their operation is believed well known. BCD thumb-wheel switch 271 has a four-bit weighted output designated 274, 275, 276 and 277, respectively. BCD switch 272 has a three-bit weight output designated 278, 279 and 280, respectively, and BCD switch 273 has a four-bit weight output designated 281, 282, 283, and 284, respectively. Outputs 274, 275, 276 and 277 of BCD switch 271 are respectively connected through diodes 285, 287 and 288 and conductors 240, 241, 242 and 243 to the 1, 2, 3 and 4 outputs of APPROACH TIME counter 237. Similarly, outputs 278, 279 and 280 of BCD switch 272 are connected by means of diodes 289, 290 and 291 and conductors 244, 245 and 246 to outputs 5, 6 and 7 of APPROACH TIME counter 237. Finally, outputs 281, 282, 283 and 284 of BCD switch 273 are respectively connected by means of diodes 292, 293, 294 and 295 and conductors 247, 248, 249 and 250 to outputs 9, 10, 11 and 12 of APPROACH TIME counter 237.

Three inputs 296, 297 and 298 of BCD switches 271, 272 and 273, respectively, are connected in common through a conductor 300 and a resistor 301 to the positive potential source 69, and through conductor 300 and a conductor 302 to an enable input 303 of a flip-flop 304. Flip-flop 304 further has a switching input 305, a reset input 306, a 0 output 307 and a 1 output 308. It should be understood that when the binary approach time counter 237 is in the 1 state, the outputs from the counter 237 will be at a relatively high potential, while when any of the outputs are in the 0 state, the potential thereon will be near zero. In other words, if APPROACH TIME counter 237 had counted no pulses and were in the 0 state, the first four outputs, for example, would all be near potential. If the BCD switch 271 was also set at 0, the current would flow from positive potential source 69 through resistor 301, conductor 300, and input 296 of BCD switch 271 to all of the outputs 274, 275, 276 and 277 of BCD switch 271 and the respective diodes 285 through 288 to the APPROACH TIME counter.

Figures 5, 6:
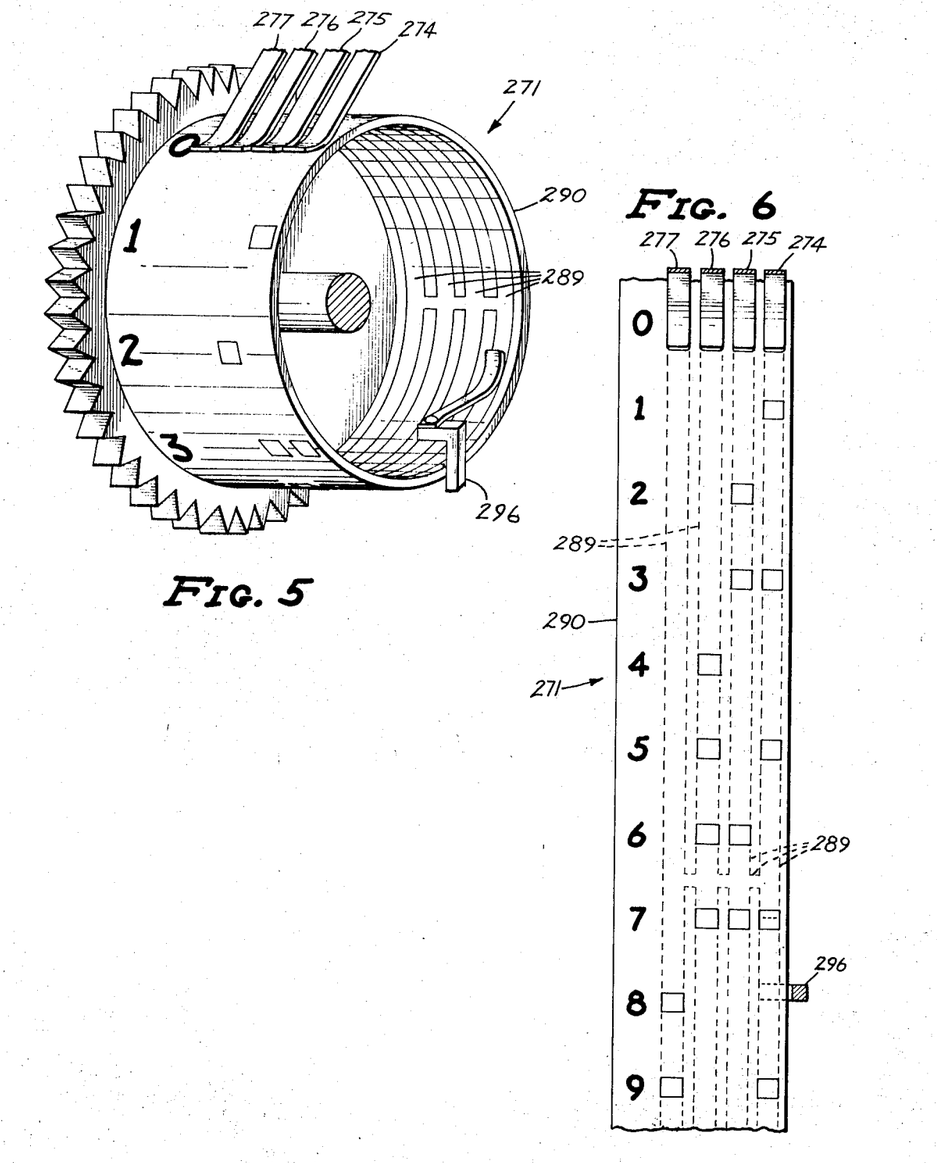
FIG. 5 is a representation of a binary coded decimal (BCD) thumb wheel utilized in a comparator circuit of the present invention.
FIG. 6 is a generated plan view of the drum portion of the thumb wheel illustrated in FIG. 5.
Figure 7:
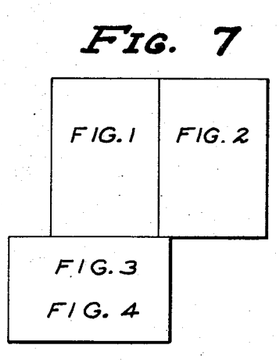
FIG. 7 is a plan view of the positioning of FIGS. 1, 2 and 3.

A pictorial representation of a binary coded decimal thumb switch of a four-bit type is shown in FIG. 5. This would correspond to the BCD switch 271, it being understood that switches 272 and 273 are substantially the same as the BCD switch shown in FIG. 5. The only difference between them is that switches 271 and 273 use four bits while switch 272 uses three bits. Referring to FIG. 5, it can be seen that output 296, which is a wiper engaged with conductor 289 on the inner surface of a drum 299, is common to all of the coded conductors or contacts on the outer face of the drum 299 of the switch 271. When the switch 271 is in the 0 position, the outputs or wipers 274, 275, 276 and 277 do not engage any contacts, and therefore, there is an open circuit between output 296 and the wipers 274 through 277. When the switch is in the 1 position, wiper 274 engages an electrical contact, and therefore, there is a completed circuit between output 296 and wiper 274. Similarly, when BCD switch 271 is in the 2 position, there will be a conductor path between output 296 and wiper 275. In the 3 position, there will be a conductive path between output 296 and both wipers or outputs 274 and 275. The code of all the positions of switch 271 is shown in FIG. 6.

Since, when any of the outputs of approach time counter 237 are in a 0 state, there is a low voltage or ground potential at that output, a conductive path will be completed from positive potential source 69 through resistor 301, conductor 300, output 296 of switch 271 and whichever of the wipers 274 through 277 which are in contact with a code conductor, through their associated diodes 285 through 288, to the ground potential at the output of the approach time counter 237. This flow will keep the voltage potential on conductor 302 at substantially ground potential. This ground potential will be fed to input 303 of flip-flop 304 and will hold flip-flop 304 in a nonenabled state However, if the output of the approach time counter 237 should go to a 1 state, the output voltage rises and the diode 285 through 288 will be back-biased thereby causing the potential on conductor 302 to rise which in turn is fed to input 303 of flip-flop 304 thereby enabling flip-flop 304.

As a specific example, assume that the setable comparator 270 is set to indicate 35 seconds. In this case the BCD switch 271, the SECONDS counter, would be set to 5, while the BCD switch 272, the ten seconds counter, would be set to 3. Since there are no minutes, the minutes counter 273 would be set to 0. In this situation, output 296 of BCD switch 271 would be in contact with wipers 274 and 276, while output 297 of BCD switch 272 would be in electrical contact with wipers or outputs 278 and 279. Since all of the inputs 276, 277, and 278 of the three BCD switches 271, 272 and 273 are common, there will be a conduction path from the potential source 69 through resistor 301, conductor 300 and outputs 296, 297 and 298 of the BCD switches 271 through 273, through wipers 274, 276, 278 and 279 and their associated diodes 285, 287, 289, and 290 to the outputs 1, 3, 5 and 6 of approach time counter 237. As long as there is any conduction path to the approach time counter outputs, the potential on conductor 302 will remain low or near ground potential. Therefore, this situation will continue until 35 pulses have been counted by approach time counter 237. After 35 pulses have been counted outputs 1, 3, 5 and 6 will all be in the binary 1 state and relatively high potentials will appear at these outputs thereby back-biasing diodes 285, 287, 289 and 290 causing the potential on conductor 302 to rise thereby enabling flip-flop 304. The significance of flip-flop 304 being enabled will be explained later during the operation of the entire clock.

The 1 kHz. output 24 of pulse rate divider 23 is connected by means of a conductor 315 to the switching input 305 of flip-flop 304. Binary 1 output 308 of flip-flop 304 is connected by means of a resistor 316 to the base 317 of an NPN-transistor 318. NPN-transistor 318 further has an emitter 319 which is connected to ground, and a collector 320 which is connected by means of a conductor 321, to the right and left decimal points 91 and 92 of digital display 90, to the right decimal input 115 of digital display 114, to the right and left decimal inputs 141 and 142 of digital display 140 and to the right and left decimal inputs 157 and 158 of digital display unit 156.

The binary 0 of output 307 of flip-flop 304 is connected by means of a capacitor 322 to the input 262 of OR-gate 261. The output 258 of AND-gate 256 is connected by means of a conductor 323 to the reset input 306 of flip-flop 304.

Output 258 of AND-gate 256 is also connected by means of conductor 322 to a reset input 324 of a flip-flop 325. Flip-flop 325 further has a SET-input 326 and a binary 0 output 327. Binary 0 output 327 of flip-flop 325 is connected to stationary contact 233 of switch 231.

An outer marker signal relay 330 has a relay coil 331, a movable contact 332 and a stationary contact 333. Relay coil 331 of relay 330 is connected between ground and an input terminal 334 adapted to receive a signal from an airport outer marker. Movable contact 332 of relay 330 is connected directly to ground, while stationary contact 333 of relay 330 is connected through a resistor 335 to the positive potential source 69. Stationary contact 333 of relay 330 is further connected by means of a conductor 336 to the SET-input 326 of flip-flop 325.

Figure 4:
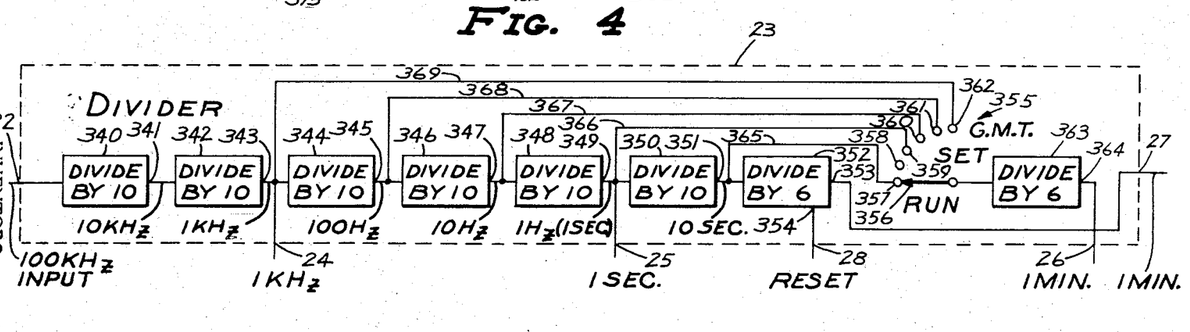
FIG. 4 is a block diagram of a pulse rate divider circuit utilized in the present invention.

Referring to FIG. 4, there is shown a block diagram representation of the pulse rate divider circuit 23. Input 22 of divider circuit 23 is connected to the input of a divide by 10 counter 340. An output 341 of counter 340 is connected to the input of a divide by 10 counter 342. An output 343 of counter 342 is connected to the input of a divide by 10 counter 344. An output 345 of divide by 10 counter 344 is connected to the input of a divide by 10 counter 346. An output 347 of divide by 10 counter 346 is connected to an input of a divide by 10 counter 348. An output 349 of divide by 10 counter 348 is connected to an input of a divide by 10 counter 350. An output 351 of divide by 10 counter 350 is connected to an input of a divide by 6 counter 352. Divide by 6 counter 352 also has an output 353 and a reset input 354. Output 353 of divide by 6 counter 352 is connected to output 27 of divider 23, while reset input 354 of divide by 6 counter 352 is connected to input 28 of divider 23.

A Greenwich Mean Time (GMT) SET/RUN switch 355 has a movable contact 356 and stationary contacts 357, 358, 359, 360, 361 and 362. Movable contact 356 of switch 355 is connected to an input of a divide by 6 counter 363. An output 364 of divide by 6 counter 363 is connected to the 1 pulse per minute output 26 of divider circuit 23. Stationary contact 357 is connected by means of a conductor 365 to the output 351 of divide by 10 counter 350. Stationary contact 358 of switch 355 is not connected to anything and constitutes a STANDBY switch for the GMT counter 196. Stationary contact 359 of switch 355 is connected by means of a conductor 366 to the output 349 of divide by 10 counter 348. Stationary contact 360 of switch 355 is connected by means of a conductor 367 to the output 347 of divide by 10 counter 346 and stationary contact 361 of switch 355 is connected by means of a conductor 368 to the output 345 of divide by 10 counter 344. Stationary contact 362 of switch 355 is connected by means of a conductor 369 to the output 343 of divide by 10 counter 342. Output 343 of divide by 10 counter 342 is further connected to the 1 kiloHertz output 24 of divider 23.

OPERATION

In operation, the timing pulse generator 20 produces a series of output pulses at a rate of 100,000 Hertz. These pulses are fed from the output 21 of pulse generator 20 to the input 22 of pulse rate divider 23. Referring to FIG. 4, the 100 kHz. input pulses are divided by 10 in divide by 10 counter 340 so that pulses at a rate of 10,000 Hertz appear at output 341 of divider 340. Similarly, divide by 10 counter 342 again divides the pulse rate by 10 so that pulses at a rate of 1,000 Hertz appear at the output 343 of divide by 10 counter 342. This pulse rate is again sequentially divided by 10 in divide by 10 counters 344, 346, and 348, so that the pulse rate at the output 349 of counter 348 is 1 pulse per second. This pulse rate is fed to output 25 of pulse rate divider 23.

The 1 per second pulses appearing at output 349 of divide by 10 counter 348 are fed to a divide by 10 counter 350 so that at the output 351 of counter 350 the pulse rate is 1 pulse per every 10 seconds. These pulses are fed through divide by 6 counter 352 so that output pulses at a rate of 1 pulse per minute appear at output 353 of divide by 6 counter 352 and are in turn transmitted to the output 27 of pulse rate divider 23. Similarly, the 1 pulse per 10 seconds output of 351 of divide 10 counter 350 are conducted through conductor 365, stationary contact 357 and movable contact 356 of switch 355 (when the stationary contact 357 is engaged with the movable contact 356) and divide by 6 counter 363 so that pulses at a rate of 1 pulse per minute appear at the output 364 of divide by 6 counter 363. These pulses in turn appear at output 26 of pulse rate divider 23.

The 1 pulse per minute pulses appearing at output 27 of pulse rate divider 23 are conducted through conductor 30 to the input 31 of the flight time counter 32. If the pilot wishes to record flight time, he first switches RUN/HOLD switch 185 to the HOLD position so that ground potential appears on conductor 192 and at the input 66 of AND gate 65. At the same time, he places switch 34 in the F or flight time position so that movable contact 35 engages fixed contact F. He then depresses movable contact 72 of switch 71 to apply a ground potential on conductor 63 which is applied to input 64 of AND-gate 65. Since both inputs 64 and 66 of AND-gate 65 are at ground potential, a signal will appear at the output 67 of AND-gate 65 which will be fed to reset input 33 of flight time counter 32 resetting counter 32 to 0.

When the flight time RUN/HOLD switch 185 is in the HOLD position, a positive potential is applied from source 69 through resistor 190 to the reset input 28 of pulse rate divider 23. This potential is further coupled to reset input 354 of divide by 6 counter 352 and sets this counter to 0.

To begin recording flight time, the pilot switches the flight time RUN/HOLD switch 185 to the RUN position, thereby grounding reset input 28 of divider 23 which in turn allows divide by 6 counter 352 to begin operation. The 1 pulse per minute output pulses appearing at output 27 of pulse rate divider 23 are then applied to input 31 of flight time counter 32 and are counted.

The outputs 1 through 7 and 9 through 14 of flight time counter 32 produce a binary weighted output indicative of the number of 1 minute counts that have been made by flight time counter 32. The binary output signals appearing at the first four outputs (1, 2, 3 and 4) of flight time counter 32 are transmitted through conductors 50 through 53, stationary contacts F-1 through F-4, movable contacts 36 through 39 of the switch 34, and conductors 74, 95, 96, and 97 to the binary inputs 75, 77, 78 and 79 of binary to decimal decoder 76. These binary signals are decoded and an output signal equal to the decimal equivalent of the binary input appears at one of the outputs 80 through 89 of binary to decimal decoder 76. This signal is conducted to the corresponding decimal input of the neon digital display 90 and causes this decimal to be displayed on the neon digital display 90.

Flight time counter 32 is constructed that the the first four outputs 1 through 4 only produce binary outputs equal to digits of 0 through 9. Upon the occurrence of the 10th input pulse to flight time counter 32, outputs 1 through 4 reset to 0 and 1 pulse is transferred to the TENS binary counter appearing at outputs 5 through 7 of flight time counter 32. The binary signals appearing at outputs 5 through 7 of flight time counter 32 only produce binary outputs equal to digits of 0 through 5 and are transmitted through conductors 54 through 56, stationary contacts F-5 through F-7 of switch 34, movable contacts 40 through 42 of switch 34, and conductors 100 through 102 to the binary inputs 103 through 105 of binary to decimal decoder 106. The binary input signal appearing at the inputs of binary to decimal decoder 106 are transformed to a decimal output appearing at one of the outputs 107 through 112 which is coupled to neon digital display 114 and lights the corresponding decimal digit. Neon digital display 114 when used in conjunction with flight time will indicate 10 minute intervals. The left decimal point 116 of the display 114 is connected directly to ground which causes it to be normally energized. This decimal point is positioned between the minutes and seconds displays.

Similarly, the binary output signals appearing at outputs 9 through 12 of flight time counter 32 are transmitted through conductors 57 through 60, stationary contacts F-9 through F-12 of switch 34, movable contacts 43 through 46 of switch 34, and conductors 120 through 123 to the binary inputs 124 through 127 of binary to decimal decoder 128. The binary signal appearing at the inputs of decimal decoder 128 will be decoded and a signal equal to the decimal equivalent of the binary input will appear at one of the outputs 130 through 139 and in turn will be conducted to the neon digital display 140 to light the corresponding decimal digit. Neon digital display 140, when used to read flight time, will correspond to unit hours, in other words, hours 0 through 9.

The binary signals appearing at outputs 13 and 14 of flight time counter 32 represent 10 intervals. Since the maximum number of hours in any one day is 24, the maximum number needed to represent 10 hour intervals is 2. At a flight time count below 10 hours the digital signals at outputs 13 and 14 of flight time counter 32 will both be binary 0 's represented by low potential. The 0 signal appearing at output 13 will be coupled through conductor 61, stationary contact F-13, movable contact 47 of switch 34 and conductor 143 to the input 145 of AND-gate 146, and the signal will be inverted through inverter 160 and applied to input 161 of AND-gate 162 as a high potential. Similarly, the binary 0 output at 14 of flight time counter 32 will be transmitted through conductor 62, stationary contact F-14, movable contact 48 of switch 34, and conductor 150 to the input 147 of AND-gate 146. The signal will also be transmitted through conductor 165 to the input 163 of AND-gate 162. Since the signal at the input 161 of AND-gate 162 is a binary 1 or high potential while the signal at the input 163 of AND-gate 162 is a binary 0, there will be no output signal at the output 164 of AND-gate 162. However, both of the signals appearing at inputs 145 and 147 of AND-gate 146 are binary 0's and, therefore, an output signal will appear at output 148 of AND-gate 146. This signal will be conducted to the base 152 of transistor 153 causing transistor 153 to conduct and lighting the 0 digit on neon digital display 156.

When the time count in flight time counter 32 is between 10 and 20 hours, a binary 1 will appear at output 13 of flight time counter 32 and a binary 0 will appear at output 14. These signals will be transmitted as before and a binary 1 signal will appear at input 145 of AND-gate 146 while a binary 0 signal will appear at input 147. Since the input signals are different, there will be no output from AND-gate 146. The binary 1 signal from output 13 of flight time counter 32 will be inverted in inverter 160 and will appear as a binary 0 at the input 161 of AND-gate 162. Since the binary 0 appearing at output 14 of flight time counter 32 is also connected to the input 163 of AND-gate 162, there will be an output signal at the output 164 of AND-gate 162 which will be coupled through resistor 166 to the base 167 of transistor 168 causing transistor 168 to conduct. The conduction of transistor 168 causes the decimal digit 1 to light in neon digital display 156.

When the time recorded in flight time counter 32 is over 20 hours a binary 1 signal will appear at output 14 of flight time counter 32 while a binary 0 signal appears at output 13. These two signals are respectively transmitted to inputs 147 and 145 of AND-gate 146, and since these signals are opposite, there will be no output from AND-gate 146. In other words, the output at 146 will be a low potential or the same as a binary 0. The binary 1 appearing at output 14 of flight time counter 32 is applied to input 163 of AND-gate 162 while the binary 0 appearing at output 13 of flight time counter 32 is inverted and appears as a binary 1 at the input 161 of AND-gate 162. AND-gate 162 inverts the input signals so a binary 0 appears at the output 164 of AND-gate 162. Since the outputs of AND-gates 146 and 162 are respectively connected to the inputs 173 and 175 of AND-gate 174, and since both of these inputs are binary 0's, a signal equivalent to a binary 1 will appear at output 176 of AND-gate 174. This signal will be transmitted through resistor 177 to the base 178 of transistor 179 causing this transistor to conduct and in turn lighting the decimal digit 2 in neon digital display 156.

The GMT-counter 196 is preset, as will be explained hereinafter, to the correct Greenwich time, and this counter operates continuously so that the correct Greenwich time will always be present in counter 196. It should be understood that the recording of Greenwich Mean Time is a time reference useful in aviation. However, other time references, such as local time, could be recorded in counter 196.

As explained previously, the 1 pulse per minute time pulses appearing at output 26 of pulse rate divider 23 are transmitted through conductor 194 to the input 195 of the GMT counter 196. If the pilot desires to know the correct Greenwich Mean Time, all that is necessary is that he turn switch 34 to the GMT position and the binary outputs 1 through 7 and 9 through 14 of the GMT counter 196 will be displayed on the neon digital displays 92, 114, 140 and 156, in exactly the same manner as the flight time recording was displayed. Since the operation of these circuits has already been explained in conjunction with the flight time counter 32, it is believed unnecessary to repeat the operation with respect to the GMT-counter 196.

However, since counter 196 is utilized to record a specific time reference and since there are only 24 hours in each day, the counter must begin to recount from 0 after it has counted 24 hours. To accomplish this, binary output 11 and binary output 14 are respectively connected to inputs 214 and 216 of AND-gate 215 are both binary 1 signals, a binary 0 or ground signal will appear at output 217 of AND-gate 215 and will be coupled to the reset input 197 of GMT-counter 196 causing the counter to clear or begin recounting from 0 time. The only time that outputs 11 and 14 of GMT-counter 196 will both have binary 1 outputs is after counter 196 has counted 24 hours.

In the event that it is desired to set counter 196 to record some time other than Greenwich Mean Time, or in the event that the counter becomes becomes in error for some reason and it is necessary to reset the time, a GMT SET/RUN switch is provided in the pulse rate divider circuit 23. As can be seen, when the GMT-counter 196 is in the RUN position or operating normally, the output 351 of divide by 10 counter 350 is connected through stationary contact 357 in movable contact 356 to the divide by 6 counter 363. The output of counter 350 is at a rate of 1 pulse for every 10 seconds, and since counter 363 is a divide by 6, its output 364 will have 1 pulse per minute. In order to speed the number of counts, or in other words, provide a higher pulse rate to the input 195 of counter 196 so as to set the counter, the switch 355 can be turned to apply pulses to the input of the divide by 6 counter 363 at rates of 1,000 Hertz, 100 Hertz, 10 Hertz, or 1 Hertz. To set the GMT counter, switch 34 is placed in the GMT position and the movable contact 356 is rotated into engagement with fixed contact 362. The high pulse rate applied to counter 196 will speed the setting of the counter 196 and the setting will be visible on the digital display output as the operator approaches the correct time setting, the pulse rate can be progressively decreased to a minimum of 1 pulse per second until the digital displays indicate the correct time. The switch 355 is then placed in the RUN position, and counter 196 thereafter continues to record the correct flight reference time.

If the pilot wishes to use the approach time counter, he first sets the counter to 0 as follows. The approach time RUN/HOLD switch 226 is switched to the HOLD position. In this position the AND-gate 222 will be disabled and no pulses from the pulse rate divider will be applied to the input of the approach time counter. Switch 34 is then moved to the A (approach time) position so that movable contact 35 of switch 34 is in engagement with fixed contact A. The pilot then depresses momentary switch 71 and applies a zero potential through switch 34 to conductor 259. This zero potential is applied to input 257 of AND-gate 256. The MANUAL/AUTOMATIC switch 231 is placed in the MANUAL position which applies a zero potential to input 255 of AND-gate 256. An output signal thereupon appears at output 258 of AND-gate 256 and is conducted through OR-gate 261 and conductor 264 to the reset input 265 of approach time counter 237 thereby resetting the approach time counter 237 to 0.

When the MANUAL/AUTOMATIC switch 231 is in the MANUAL position and the approach time RUN/HOLD switch 226 is placed in the RUN position, input 223 of AND-gate 222 is held at zero potential thereby enabling AND-gate 222, so that the 1 pulse per second pulses appearing at output 25 of pulse rate divider 23 are transmitted through AND-gate 222 and conductor 235 to the input 236 of approach time counter 237. The outputs 1 through 7 and 9 through 14 of approach time counter 237 are connected through switch 34 to the neon digital displays, in the same manner as are the outputs of the GMT counter and the flight time counter. Since this operation has been explained previously, it will not be repeated with respect to the approach time counter. However, it should be kept in mind that since the input pulses to the approach time counter are occurring at a rate of 1 per second, the binary output signals on the outputs 1 through 4 of counter 237 will represent unit seconds rather than minutes as in the GMT counter and the flight time counter. Similarly, the binary output signal appearing on outputs 5 through 7 of approach time counter 237 will represent 10 second intervals rather than 10 minute intervals as in the previous counters. Similarly, the binary output signals appearing at 9 through 12 of approach time counter will represent minutes rather than hours and the binary signals appearing at outputs 13 and 14 of approach time counter 237 will represent 10 minute intervals instead of 10 hour intervals.

To utilize the approach time system of the present invention, the pilot, before he reaches his destination, clears the approach time counter to 0 and then consults his destination airport chart to determine the required approach time from the airport outer marker to the missed approach point. Assume that this time is indicated on the airport chart as 1 minute 23 seconds. He then sets the seconds thumb-wheel 271 to 3, the ten seconds thumb-wheel switch 272 to 2, and the minutes thumb wheel switch 273 to 1. Referring to FIGS. 5 and 6, it can be seen that with the seconds thumb wheel switch 271 set at 3, output 296 will be in electrical contact with outputs or wipers 274 and 275 of switch 271. Output 297 of ten seconds thumb-wheel switch 272 will be in electrical contact with output 279, and output 298 of minutes thumb-wheel switch 273 will be in electrical contact with output 281. As explained previously, outputs 274 and 275 of switch 271 conduct through diodes 285 and 286 to the 1 and 2 outputs of approach time counter 237. Similarly, output 279 of ten seconds thumb-wheel switch 272 conducts through diode 290 to output 6 of counter 237, and output 281 of minutes thumb-wheel switch 273 conducts through diode 292 to output 9 of approach time counter 237. This conduction holds conductor 302 at near zero potential which in turn holds flip-flop 304 in a disabled condition. Conductor 302 will remain near zero potential until all of the diodes 285, 286, 290 and 292 are back-biased so that the potential on conductor 302 can rise. When the aircraft arrives at its destination and passes over the airport outer marker, he switches the approach time RUN/HOLD switch 226 to RUN and the approach time counter 237 begins counting.

When approach counter 237 has counted 1 min. 23 sec., binary 1 signals will appear at its outputs 1, 2, 6 and 9 thereby back-biasing the diodes 285, 286, 290 and 292 causing the potential on conductor 302 to rise which in turn will be fed to input 303 of flip-flop 304 enabling flip-flop 304. Once flip-flop 304 is enabled the next pulse appearing at output 24 of pulse rate divider 23 will be conducted through conductor 315 to the switching input 305 of flip-flop 304 causing flip-flop 304 to change from its binary 0 to binary 1 state. As flip-flop 304 changes state, a signal will be transmitted from output 307 of flip-flop 304 through capacitor 322, and OR-gate 261 and conductor 264 to the reset input 265 of approach time counter 237 thereby causing counter 237 to begin recounting from 0. At the same time, as flip-flop 304 moves to its 1 state a signal at its output 308, which is coupled through resistor 316 to the base 317 of transistor 318, causes transistor 318 to conduct. The conduction of transistor 318 causes conductor 321 to drop to near zero potential, and this signal is transmitted to the right and left decimal point input of the neon displays 90, 114 (other than the left decimal point 116), 140 and 156, causing the left and right decimal points of each of these displays to light up. When the pilot reads the digital display output with all of the decimal points lit, he knows that the time indicated on the display output refers to the amount of time he is over his prescribed approach time.

At many airports the runway outer marker provides a radio signal to the aircraft to indicate when the aircraft is passing over the outer marker. The digital timing system of the present invention is provided with an automatic start system responsive to the radio signal from the outer marker to automatically start the approach time counter 237.

If the pilot's destination is an airport that has a radio outer marker, he proceeds as before in resetting the approach time counter 237 to 0, and then places the MANUAL/AUTOMATIC switch 231 in the automatic position and the approach time RUN/HOLD switch 226 in the RUN position. At this time the input 223 of AND-gate 222 will be connected through movable contacts 228 of switch 226 and movable contact 230 and fixed contact 233 of switch 231 to the binary 0 output 327 of flip-flop 325. Since flip-flop 325 is in the binary 0 state, a relatively high potential will be appearing at output 327 which in turn will be applied to input 223 of AND-gate 222 holding AND-gate 222 in a disabled or off state.

As the aircraft passes the airport outer marker, the radio signal will operate an "outer marker" lamp on the panel of the airplane. The relay 330 is connected across this lamp by wire 334. The voltage across the lamp is applied to terminal 334 and through relay coil 331 to the common, thereby energizing relay coil 331 of relay 330. This in turn will cause movable contact 332 to engage with fixed contact 333 causing conductor 336 to drop to near zero potential. This in turn will be fed to input 326 of flip-flop 325 causing the flip-flop to change from its binary 0 to its binary 1 state. When flip-flop 325 is in a binary 1 state, a substantial zero potential appears at output 327 of flip-flop 325 which in turn will be conducted to input 223 of AND-gate 222, thereby enabling AND-gate 222 and allowing the 1 pulse per second pulses from the output of pulse rate divider 25 to be applied through conductor 235 to the input of approach time counter 237 and initiating the approach time count.

What is claimed is:

1. A digital timing system comprising:
   a. a time base generator for producing output timing pulses;
   b. a plurality of time pulse counters;
   c. means connecting each of said time pulse counters to said time base generator;
   d. digital display means; and
   e. means switchably connecting said digital display means to each of said time pulse counters to display the time count in each counter without affecting the time count therein and without affecting the continual counting of the counters.

2. A digital timing system comprising:
   a. a pulse generator for producing a train of output pulses;
   b. a pulse rate divider having an input and a plurality of outputs;
   c. means connecting the input of said pulse rate divider to receive the train of output pulses from said pulse generator;
   d. a plurality of counter circuits;
   e. means connecting a different one of said plurality of outputs of said pulse divider to a different one of said plurality of counter circuits each of said counter circuits counting the pulses appearing at the pulse divider output associated therewith;
   f. means connected to each of said counter circuits whereby each counter circuit can be independently activated to count pulses regardless of the operation of the other counter circuits;
   g. a digital display means;
   h. means switchably connecting said digital display means to each of said counter circuits to display the count in each counter without affecting the count therein and without affecting the continual counting of the counters;

i. signal producing means for producing a signal indicative of any predetermined count in one of said plurality of counter circuits;

j. comparator means for comparing the output of said signal producing means and the output of said one of said counter circuits and for producing a trigger signal when said outputs are equal; and k. means connecting said comparator means to said one counter circuit whereby said counter circuit is reset to zero count when said comparator trigger signal occurs.

3. A digital timing system comprising:

a. a pulse generator having a high pulse rate timing pulse output;

b. a pulse rate divider circuit connected to the output of said pulse generator, said divider circuit having a first output which provides output pulses at a rate of 1 pulse per second and at least a second output which provides output pulses at a rate of 1 pulse per minute;

c. first, second and third counter circuits each having an input and an output;

d. means connected to each of said counter circuits whereby each counter circuit can be independently operated to count pulses regardless of the operation of the other counter circuits;

e. means connecting the input of said first counter circuit to the second output of said divider circuit, said first counter operating to record a predetermined reference time;

f. means connecting the input of said second counter circuit to the second output of said divider circuit, said second counter operating to record total elapsed time of a predetermined event;

g. means connecting the input of said third counter circuit to the first output of said divider circuit whereby said third counter, when operating, will count the output pulses therefrom;

h. a variable comparator circuit setable over a range of predetermined counts in said third counter circuit;

i. means connecting said variable comparator circuit to said third counter circuit, said comparator circuit producing an output signal when the count in said third counter circuit equals a preset count in said comparator;

j. means connecting said comparator to said third counter circuit to cause said third counter circuit to begin recounting from zero upon the occurrence of an output signal from said comparator;

k. a digital display means; and l. means switchably connecting said digital display means to each of said first, second and third counter circuits to individually display the count in each counter without affecting the count therein or affecting the continued counting of the counters.

4. A digital timing system comprising:

a. a counter circuit having an input adapted to receive timing pulses and to count the same;

b. a variable comparator circuit;

c. means for selectively setting said variable comparator circuit over a range of predetermined counts in said counter circuit;

d. means connecting said variable comparator circuit to said counter circuit, said comparator circuit producing an output signal when the count in said counter circuit equals a preset count in said comparator; and e. means connecting said comparator to said counter circuit to cause said counter circuit to reset and to begin recounting upon the occurrence of an output signal from said comparator.

5. A digital timing system as defined in claim 4 wherein said counter has an output connected to a digital display.

6. A digital timing system as defined in claim 3 wherein said digital display means is a neon display and wherein said means switchably connecting said digital display means to each of said first, second and third counter circuits includes a binary to decimal decoder circuit.

7. A digital timing system as defined in claim 1 for use in aviation flight timing and wherein one of said plurality of counters records Greenwich Mean Time, a second of said plurality of counters records total elapsed flight time and a third of said plurality of counters records aircraft landing approach time.

8. A digital timing system comprising:

a. a counter circuit having an input adapted to receive timing pulses and to count the same;

b. a variable comparator circuit selectively settable over a range of predetermined counts in said counter circuit; and c. means connecting said variable comparator circuit to said counter circuit, said comparator circuit operable to cause said counter circuit to begin recounting from zero after the occurrence of a predetermined number of timing pulses, the predetermined number of timing pulses being determined by the setting of said variable comparator.

9. A digital timing system comprising:

a. a counter circuit having an input adapted to receive timing pulses and to count the same;

b. a digital display means connected to said counter circuit to display the pulse count therein, each digit of said digital display having a decimal point associated therewith, each of said decimal points being operable between a deenergized and an energized state;

c. means connected to one of said decimal points to energize the same to separate the digital display in a predetermined manner;

d. a variable comparator circuit setable over a range of predetermined counts in said counter circuit;

e. means connecting said variable comparator circuit to said counter circuit, said comparator circuit producing an output signal when the count in said counter circuit equals a preset count in said comparator;

f. means connecting said comparator to said counter circuit to cause said counter circuit to reset and to begin recounting upon the occurrence of an output signal from said comparator; and g. means connected to said digital display means to energize all of said decimal points when said counter circuit is reset.

10. A digital timing system as set forth in claim 9 which further includes means for manually clearing said counter circuit and means connected to said counter circuit to prevent automatic resetting of said counter circuit more than once until said counter has been manually cleared.

11. A digital timing system comprising:

a. a pulse counter circuit having a timing input, in reset input and an output;

b. first AND gate means having first and second input and an output;

c. a timing pulse generator for producing timing pulses at its output;

d. means connecting the output of said timing pulse generator to the first input of said first AND gate;

e. means connecting the output of said first AND gate to the timing input of said pulse counter circuit;

f. second AND gate means having first and second inputs and an output;

g. first switch means having a first stationary contact, a second stationary contact and a movable contact;

h. means connecting the second input of said first AND gate to the first stationary contact of said first switch means;

i. means connecting the first input of said second AND gate to the second stationary contact of said first switch means;

j. means connecting the second input of said second AND gate through a momentary switch to a signal source suitable for enabling said second AND gate;

k. means connecting the movable contact of said first switch means to a signal source suitable for enabling said first and second AND gates;

l. means connecting the output of said second AND gate to the reset input of said pulse counter circuit; and m. a digital display means connected to the output of said pulse counter circuit to display the pulse count therein.

12. A digital timing system as set forth in claim 11 wherein a variable comparator circuit, setable over a range of predetermined counts in said counter circuit, is connected to the output of said pulse counter circuit, said comparator circuit producing an output signal when the count in said pulse counter circuit equals a preset count in said comparator and wherein the output of said comparator is connected to the reset input of said pulse counter circuit to cause said counter circuit to reset and to begin recounting upon the occurrence of an output signal from said comparator.

* * * * *